H. N. BIGGER.
FRUIT PICKER.
APPLICATION FILED MAY 29, 1917.
1,257,791.
Patented Feb. 26, 1918.
2 SHEETS—SHEET 1.
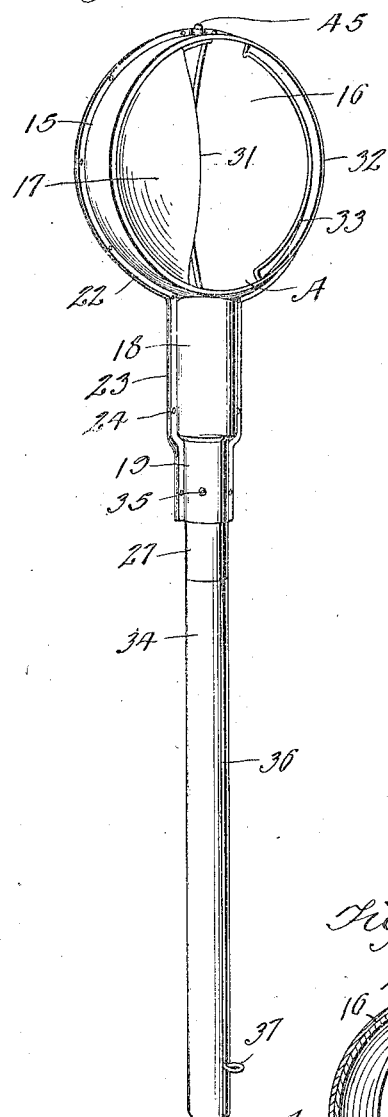
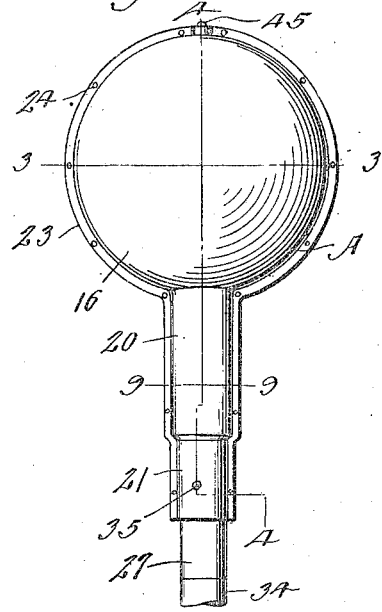
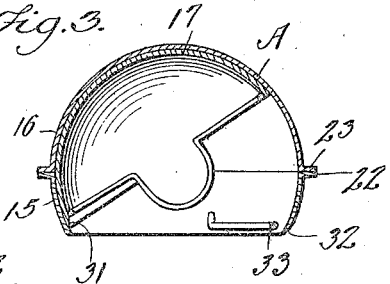
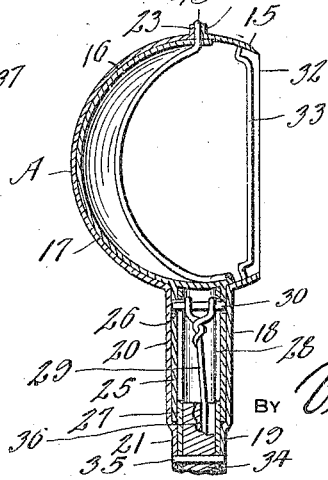
WITNESSES
INVENTOR
H. N. Bigger,
BY Victor J. Evans
ATTORNEY H. N. BIGGER.
FRUIT PICKER.
APPLICATION FILED MAY 29, 1917.
1,257,791.
Patented Feb. 26, 1918.
2 SHEETS—SHEET 2.
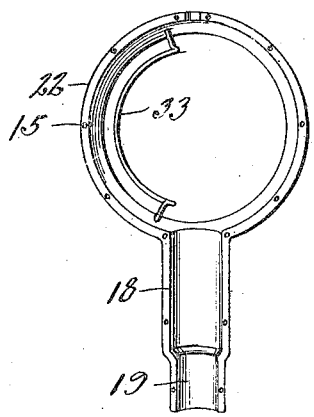
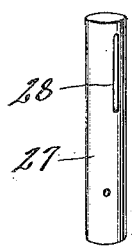
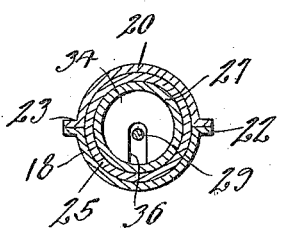
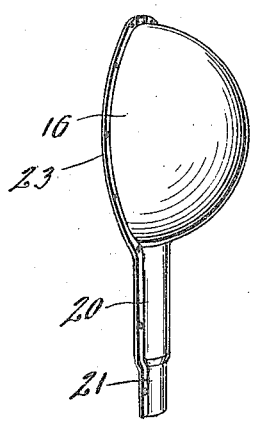
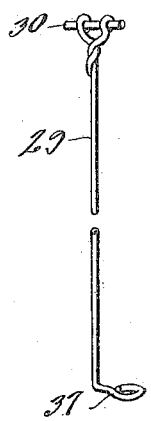
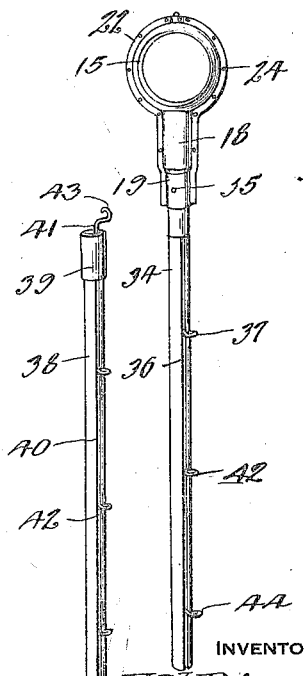
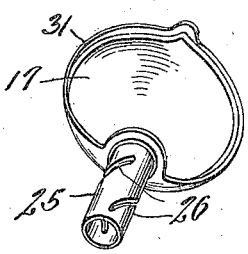
WITNESSES
INVENTOR
H. N. Bigger,
BY Victor J. Evans
ATTORNEY

UNITED STATES PATENT OFFICE.

HARRY N. BIGGER, OF ONEIDA, NEW YORK.

FRUIT-PICKER.

1,257,791.   Specification of Letters Patent.   Patented Feb. 26, 1918.

Application filed May 29, 1917. Serial No. 171,748.

*To all whom it may concern:*

Be it known that I, HARRY N. BIGGER, citizen of the United States, residing at Oneida, in the county of Madison and State of New York, have invented new and useful Improvements in Fruit-Pickers, of which the following is a specification.

This invention relates to fruit pickers of that general class or type which are provided with a fruit engaging and receiving element, a fruit detaching element, an extension handle and with means for actuating the detaching element.

The invention has for its object to produce a fruit picker of the above type, of simple and improved construction, the same having an approximately spherical head which includes a movably supported element that constitutes a door or shutter and which also serves as a detaching device.

A further object of the invention is to produce a device of the class described having simple and improved means for actuating the shutter.

Further objects of the invention are to simplify and improve the construction, arrangement and combination of the component parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a perspective view showing the head and the handle of the improved fruit picker, the same being seen from what would be regarded as the front side, and the shutter being partly closed.

Fig. 2 is a rear elevation of the same.

Fig. 3 is a sectional view taken on the line 3—3 in Fig. 2.

Fig. 4 is a vertical sectional view taken on the line 4—4 in Fig. 2.

Fig. 5 is a perspective detail view of the member which constitutes the body portion of the head.

Fig. 6 is a perspective detail view of the member constituting the rear portion of the head.

Fig. 7 is a perspective detail view of the member constituting the shutter.

Fig. 8 is a perspective detail view of the slotted tubular member about which the shank portion of the shutter rotates.

Fig. 9 is a sectional detail view taken on the line 9—9 in Fig. 2 through the shank portion of the head.

Fig. 10 is a perspective view of the rod whereby the shutter is actuated.

Fig. 11 is a perspective view of the complete device showing also a handle extension member, detached.

Corresponding parts in the several figures are denoted by like characters of reference.

The head A of the improved fruit picker is of approximately spherical shape and it is composed of three distinct parts namely, a central or body portion 15, a back member 16 and a movable door or shutter 17. These parts may be conveniently stamped or otherwise formed from sheet metal although no limitation is made to the use of this particular material.

The main or body portion 15 consists of a ring or annulus of substantially arcuate cross section and having a downwardly extending shank 18 of semi-tubular form, said shank having a downwardly extending portion 19 of reduced diameter. The back member 16 which is of cup-shape and approximately semi-spherical form is likewise provided with a downwardly extending shank portion 20 having a reduced downward extension 21. The meeting edges of the body member and the back member including the respective shanks and reduced portions are provided with flanges 22, 23 having apertures for the passage of connecting members such as screws, bolts or rivets 24 whereby said body portion and back member may be connected together, it being readily seen that when thus connected the respective shank portions and lower reduced ends will combine to form a tubular structure, the upper portion of which is of a diameter exceeding that of the lower portion.

The door or shutter 17 is cup-shaped substantially like the back member 16 and it is provided with a downwardly extending tubular shank 25. This shank portion is provided with spirally disposed slots 26, and said shank portion is disposed within the tubular member formed by the shank portions 18 and 20 of the members 15 and 16 respectively, the said slotted shank 25 being fitted in the upper portion of said tubular member. Fitted in the lower reduced portion of said tubular member and extending upwardly within the slotted shank 25 is a tube 27 about which the said slotted shank is free to rotate. The tubular bearing member 27 is provided with longitudinal slots 28 in diametrically opposite sides thereof. 29 is a rod arranged to slide longitudinally within the tube 27, said rod carrying at the upper end thereof a cross bar 30 which extends through the longitudinal guide slots 28 in engagement with the spiral slots 26 formed in the tubular shank of the shutter. It follows that by reciprocating the rod 29 the shutter may be rotated about its vertical axis which coincides with that of the tubular shank 25.

It is to be observed that the parts are to be so arranged and proportioned that the shutter at one limit of its movement will practically be disposed within a portion of the head formed by the body member 15 and the back member 16, while at the other limit of its movement the greater portion thereof will be disposed externally of the body member 15, thereby completing the approximately spherical structure of the head. The said shutter has a cutting edge 31 with which a cutting edge 32 of the body member 15 coöperates to perform a shearing action when the shutter is closed. Within the annular body member 15, adjacent to the cutting edge 32, is disposed a guard member 33 which may consist of a wire bridge, the office of which is to prevent the fruit from being injured by the action of the cutting members.

The lower end of the tubular guide member 27 receives a handle 34 which may be assembled with the reduced shank portions 21, 23 and with the tubular guide member 27 by means of a transverse pin or rivet 35. The handle member 34 must be provided with a groove 36 in which the rod 29 is free to move, said rod being provided at its lower end with an eye 37. One or more extensions 38 may be used in connection with the handle, one such extension having been shown in Fig. 11 of the drawings, said extension being provided with a ferrule 39 forming a socket whereby connection may be established between the parts. The extension member is grooved longitudinally as seen at 40 for the reception of an operating rod 41 which slidably engages said groove wherein it may be retained by any convenient means. Each operating rod is provided at suitable intervals with loops 42 forming convenient operating means. The ends of proximate operating rods may be joined together, detachably, by means of inter-engaging hooks 43 and eyes 44.

The cup-shaped shutter 17 may be provided with a pin 45 arranged in axial alinement with the tubular shank 25 and having a bearing in the upper portion of the body member 15.

In the operation of this device the operating rod is moved to swing the shutter within the main back portions of the head which is then presented to the fruit which it is desired to pick, the fruit being permitted to pass within the open head portion. The shutter is now closed by a quick downward movement of the operating rod, thereby severing the stem of the fruit which latter is inclosed within the head which may now be lowered and placed in proximity to a basket or other receptacle after which the shutter is swung open and the fruit discharged.

I claim:—

1. In a fruit picker, an approximately spherical head including an open annular body portion, a cup-shaped back portion connected therewith and a cup-shaped shutter member adapted to swing within the remaining head portion, said shutter and body member having coacting cutting edges, and said body member being provided with a bridge constituting a guard member.

2. In a fruit picker, including an open annular body portion and a back portion, said body and back portions having downwardly extending shank portions that combine to form a tubular socket, the lower end of which is of reduced diameter, a bearing tube fitted in the reduced end of the socket and having a portion extending within the large end of the socket and provided with longitudinal slots, and a cup-shaped shutter, also forming a part of the head; said shutter having a tubular shank extending within the large portion of the socket and surrounding the slotted portion of the bearing tube, said tubular shank being provided with spirally disposed slots; in combination with an operating rod arranged for longitudinal movement within the guide tube and having a cross bar extending through the slots in said guide tube in engagement with the spirally disposed slots in the shank of the shutter.

3. In a fruit picker, including an open annular body portion and a back portion, said body and back portions having downwardly extending shank portions that combine to form a tubular socket, the lower end of which is of reduced diameter, a bearing tube fitted in the reduced end of the socket and having a portion extending within the large end of the socket and provided with longitudinal slots, and a cup-shaped shutter, also forming a part of the head; said shutter having a tubular shank extending within the large portion of the socket and surrounding the slotted portion of the bearing tube, said tubular shank being provided with spirally disposed slots; in combination with an operating rod arranged for longitudinal movement within the guide tube and having a cross bar extending through the slots in said guide tube in engagement with the spirally disposed slots in the shank of the shutter, and a handle member fitted in the lower end of the bearing tube, said handle member being equipped with an operating rod detachably connected with the operating rod within the bearing tube.

In testimony whereof I affix my signature.

HARRY N. BIGGER.

Copies of this patent may be obtained for five cents each, by addressing the "Commissioner of Patents, Washington, D. C."